(12) United States Patent
Marshall et al.

(10) Patent No.: US 8,756,627 B2
(45) Date of Patent: Jun. 17, 2014

(54) DISTRIBUTED VIDEO CREATION

(71) Applicant: Jumpercut, Inc., Portland, OR (US)

(72) Inventors: Philip D. Marshall, Portland, OR (US); Pooya R. Ghiaseddin, South Bend, IN (US)

(73) Assignee: Jumpercut, Inc., Portland, OR (US)

( * ) Notice: Subject to any disclaimer, the term of this patent is extended or adjusted under 35 U.S.C. 154(b) by 0 days.

(21) Appl. No.: 13/865,575

(22) Filed: Apr. 18, 2013

(65) Prior Publication Data

US 2013/0283319 A1    Oct. 24, 2013

Related U.S. Application Data

(60) Provisional application No. 61/635,749, filed on Apr. 19, 2012, provisional application No. 61/798,775, filed on Mar. 15, 2013.

(51) Int. Cl.
```
H04N 7/10       (2006.01)
H04N 21/63      (2011.01)
H04N 21/2343    (2011.01)
H04N 21/236     (2011.01)
H04N 21/458     (2011.01)
```

(52) U.S. Cl.
CPC ..... *H04N 21/632* (2013.01); *H04N 21/234345* (2013.01); *H04N 21/236* (2013.01); *H04N 21/458* (2013.01)
USPC .................... 725/32; 725/53; 725/49; 725/59

(58) Field of Classification Search
CPC ................ H04N 21/632; H04N 21/234345; H04N 21/236; H04N 21/458
USPC .......................................... 725/32, 53, 49, 59
See application file for complete search history.

(56) References Cited

U.S. PATENT DOCUMENTS

| | | | |
|---|---|---|---|
| 7,080,392 B1 * | 7/2006 | Geshwind ........................ 725/34 |
| 8,341,525 B1 * | 12/2012 | Achour et al. ................ 715/716 |
| 8,667,520 B2 * | 3/2014 | Bhatia et al. .................... 725/12 |
| 2008/0019576 A1 * | 1/2008 | Senftner et al. ............... 382/118 |
| 2011/0113336 A1 * | 5/2011 | Gunatilake ................... 715/723 |
| 2013/0117671 A1 * | 5/2013 | Long et al. .................... 715/725 |
| 2013/0235223 A1 * | 9/2013 | Park et al. .................. 348/218.1 |
| 2013/0343729 A1 * | 12/2013 | Rav-Acha et al. ............ 386/285 |

\* cited by examiner

*Primary Examiner* — Pankaj Kumar
*Assistant Examiner* — Sahar Baig
(74) *Attorney, Agent, or Firm* — Stolwitz Ford Cowger LLP (57) ABSTRACT

In an example, a system for distributed video creation is provided. In an example, the system enables users to create the ideas that they and others might film and/or upload. These may be single scene ideas, or multiple scene ideas. These ideas may be as part of a broader, existing video work, or a new video work. These ideas may be manifested as text (such as descriptions or instructions) or verbal (audio), or through pictures or video.

16 Claims, 6 Drawing Sheets

DISTRIBUTED VIDEO CREATION

PRIORITY

This application claims benefit of U.S. Provisional Application No. 61/635,749 filed on Apr. 19, 2012, entitled: DISTRIBUTED MOVIE-MAKING SERVICE and U.S. Provisional Application No. 61/798,775 filed on Mar. 15, 2013, entitled: DISTRIBUTED MOVIE-MAKING SERVICE, each of which is herein incorporated by reference in its entirety.

COPYRIGHT NOTICE

© 2012, 2013, Jumpercut LLC. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

BACKGROUND

Known video editing software allows a user to modify a video and/or combine another video with the video. The process involves collecting video(s) on a mobile device or a desktop computer associated with the video editing software. The video editing software can then output edited video based on the collected video(s). A user may share the output video with others by email, a message board, a video sharing website like YouTube®, or the like.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

A system for distributed video creation is provided. In an example, the system enables users to create the ideas that they and others might film and/or upload. These may be single scene ideas, or multiple scene ideas. These ideas may be as part of a broader, existing video work, or a new video work. These ideas may be manifested as text (such as descriptions or instructions) or verbal (audio), or through pictures or video.

In an example, the system enables users to invite others to participate in video projects. This may be an "exclusive" invitation, where only those invited can participate. This may be an "inclusive" invitation, where those invited, and others, may participate. This may be an invitation to participate in all, or part of a video project. This may be an invitation to add scenes, or only alternative video takes for existing scenes. This may be an invitation to play a particular role, or character in scenes, which may be based on the user's prior work. This may be an invitation based on stored or referenced attributes of the user, such as gender, age, preferences, what others like them did, based on their friends recommendations, or other personal attributes.

In an example, the system enables users to participate in videos/movies that either they, or others, created, by filming or uploading their video takes. These may be filmed/uploaded to the specific idea/instructions provided. These may also be filmed/uploaded in addition to, or alternatives to, the instructions provided. For example, the user may be adding a scene to extend the story that was already created. Participation (filming/uploading) may be restricted based on invitation criteria, role/character, and or other data attributes such as personal data, preferences, or other data.

In an example, participants in videos may be requested or required to complete specific scenes. For example, a user may be required to complete all scenes, or none of his/her scenes will be visible to others.

In an example, the system enables users to navigate videos by choosing either sequential videos, and/or alternate videos. There may be "scenes" which progress sequentially, and "takes" which are alternate video clips for any given scene.

In an example, the videos available for viewing may be predicated upon the videos that have already been viewed. For example, a video that is chosen may result in a "branch" that leads to other, or different video options.

In an example, videos available for viewing may be predicated upon data stored or referenced on the user, such as their personal data, preferences, questionnaire answers, clicks of links on a website.

In an example, the system enables videos to be pre-selected for viewing based upon criteria such as videos previously viewed and/or data attributes of the user, including personal attributes, preferences, other data etc.

In an example, videos are made available for viewing, users may choose to watch those videos, which might play seamlessly, i.e. stitched together as a single video, or they may be presented as video "Chapters" that they can choose from.

In an example, the system enables a sequence of videos to be chosen for the user. The sequence can be based upon a sequence of actions taken on other media, such as answers to questionnaires, links on a web page, or other sequential actions. The sequence can be based upon data attributes of the user, including personal attributes, what people like them or their friends chose, their preferences, their prior work, their points other data, etc.

In an example, the system enables videos may play sequentially, seamlessly, as if playing as a single video, but may in fact be separate videos.

In an example, the system enables a sequence of video takes to be stored.

In an example, the system enables the stitching of any sequence of videos together as a single video file.

In an example, the system enables users to share any sequence with others. Sharing may be as a sequence of individual sequential videos. Sharing may be as a stitched single video.

In an example, the system enables videos to be viewed non-linearly. For example, a sequence, or the next video file, may be chosen by the user, or chosen for the user by the system. Information about how that sequence that was viewed, or selected by the user, or selected for the user, may be stored, shared, stitched, etc.

The system enables users to compete with others. Factors to compete upon might be how much their work (projects or videos) is viewed, shared, liked, etc. The reward for competition might be recognition on the network, invitation to participate in other videos/movie projects, prizes, etc.

In an example, the system enables projects and videos may be made visible to all, or only to a select audience. View restriction criteria may be based upon who was invited, or who is creating a project. For example, if a business creates a project it's possible that none of their projects will be visible.

In an example, the system enables a member to earn points/credits for creating, participating, competing to be chosen by project creator and others, and/or for adopting sponsored challenges.

Additional aspects and advantages of this invention will be apparent from the following detailed description of preferred embodiments, which proceeds with reference to the accompanying drawings.

DETAILED DESCRIPTION OF PREFERRED EMBODIMENTS

In an example, a person using their mobile device might create a video project and send an invitation to people, with whom they are socially networked, to participate in that video project. People who are invited to participate might see the instructions for the scenes of the video project, add to those instructions, upload their video recording (i.e. their take), into the system, along with other participants who also upload their takes into the system. These and other users of their mobile devices and/or computers might select their favorite takes among the available takes, and save or share their chosen sequence of takes, aka a "cut", with others. These participants might contribute their takes while concurrently others are contributing their takes and still others are selecting their preferred sequences of takes.

In another example, a business using web-enabled computers might use this service to distribute a video project and scenes, with scene descriptions, concurrently to any of their fans or customers who wish to participate. The participants, using their mobile devices, might upload videos or takes to these scenes, and they might choose any of the available takes to stitch together into a single video file in order to share it with others.

In another example, a user may select a video, and the available subsequent videos may change based upon the selection, representing a "branch" that the user may view, or add to.

In another example, a user completes a questionnaire, and the video sequence pertaining to their answers is assembled for them for viewing, storing and sharing.

In another example, data stored or referenced on the user guides the user through a series of videos and allows that personalized sequence of videos to be viewed, stored and shared.

Figure 1:
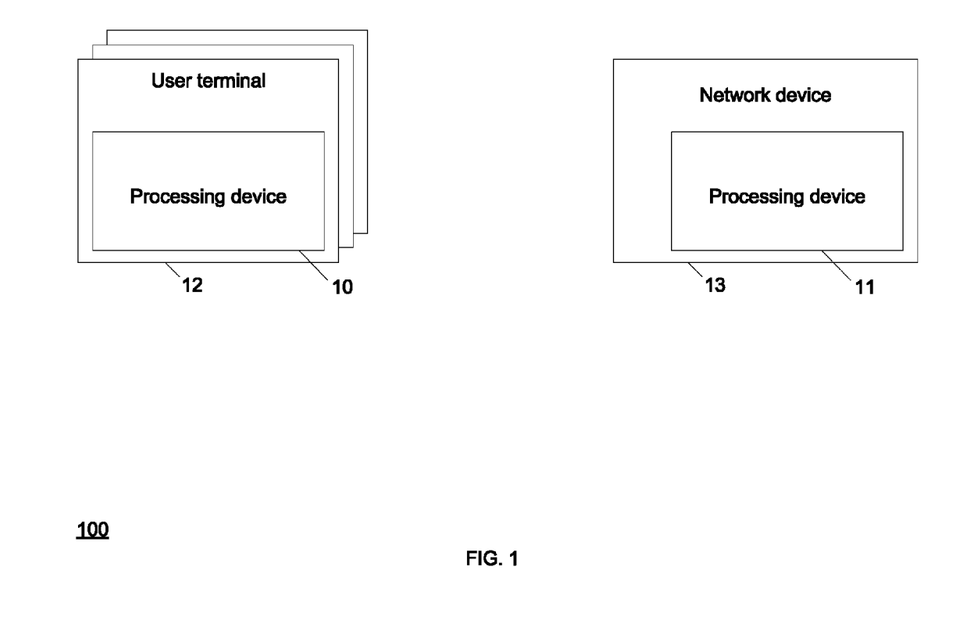
FIG. 1 illustrates a system for distributed video creation.

FIG. 1 illustrates a system for distributed video creation.

The system 100 includes user terminals 12, which may include mobile devices (such as smart phones, desktop computers, laptops, etc. Each of the user terminals 12 includes a processing device 10 to communicate over at least one electronic network with a processing device 11 for providing a distributed video service. The processing device 11 may reside within a network device 13, which may comprise any number of servers and/or other elements.

The system 100 allows a user of one of the terminals 12 to create a description of a video project to be created collaboratively, i.e. one portion of the video project will be provided by a different member and a different one of the user terminals 12 than another portion of the video project. It should be appreciated that each member may comprise an individual or an organization. The video project may be divided into any number of scenes, each of which may have an associated scene description.

The originating one of the user terminals 12 may transmit information to the processing device 11 to control which one(s) of the other user terminals 12 can contribute to the video project. The contributing user terminals may upload a video segment (the video segment may be created using known video editing tools) corresponding to one of the scenes.

The processing device 11 may assign a take identifier to each upload. The processing device 11 may provide a list of the take identifiers to the originating member, e.g. to the originating one of the user terminals. The processing device 10 may display its respective user terminal 12 to display content associated with each take and/or a description of each take, and allow the originating member to select a subset of the takes for each scene, e.g. one take for each scene. In response to receiving a selection, the processing device 12 transmits an array, i.e. a list of take identifiers. The array may indicate a play out sequence for the selected takes.

In response to receiving the array, in an example, the processing device 11 may stitch together the uploaded videos corresponding to the take identifiers in the order indicated by the array. In an example, the stitching may comprise assembling a single encoded video from a plurality of the same or differently encoded videos. If a single encoded video file is stitched, a network address may be associated with the single encoding. The network address may be shared with a video-sharing website, such as YouTube®.

Also, instead of or in addition to stitching, the processing device 11 may share a portion of the video project with other user terminals 12. For example, all of the takes may be accessible to some or all of the other user terminals 12, or the contributing member may select a subset of the uploaded takes, the subset including take(s) for a given scene, and a member of another one of the user terminals 12 may access the subset. Responsive to a user of one of the other user terminals 12 selecting from the accessible takes (which again may be all of the takes or only a subset of the takes), the processing device 11 may receive an array similar to the previously discussed array, which the processing device 11 may stitch similar to as previously discussed.

The aforementioned provisional applications, each of which are incorporated by reference herein in their entirety as indicated in the priority claim paragraph, provide more detail on some of the features described above (and more generally on some of the features described herein). Also, the aforementioned provisional applications describe other relevant features that may be included in examples of the system 100.

In an example, the processing device 11 comprises a memory device having instructions stored thereon that, in response to execution by a processor, cause the processor to perform operations comprising: storing in a database on a network a plurality of profiles each corresponding to a respective member of a distributed video service; receiving a description of a scene from a particular one of the members; identifying a subset of the other members; causing user terminals associated with only the identified subset of members to display the scene description; assigning each video of a plurality of member-provided videos with a different take identifier; providing information associated with the member-provided videos to a user terminal associated with the particular one of the members, wherein the provided information includes at least the take identifiers; receiving a selection from the user terminal associated with the particular one of the members, wherein the received selection includes a take identifier of the plurality of take identifiers; and combine the member-provided video associated with the take identifier of the received selection with another one of the member-provided videos. Combining the videos may comprise stitching and/or delivery a selected sequence of takes to a user terminal.

In an example, the received description of the scene comprises more than one scene description, and wherein the received selection includes a plurality of take identifiers at least one of which corresponds to a different one of the scene descriptions than another one of the plurality of take identifiers; and wherein the operations further comprise: assigning a first video the plurality of member-provided videos with a first scene identifier that is different than a second scene identifier assigned to a second video the plurality of member-provided videos; providing an array of the scene identifiers and the take identifiers to the user terminal associated with the particular member.

In an example, the operations further comprise, in response to receiving a selection from the array, generating a single media file that a subset of the member-provided videos in a sequential order according to the scene identifiers of the member provided videos of the subset.

In an example, the operations further comprise: in response to receiving a selection from the array, enabling a user terminal of the other members to select from a plurality of combinations of a subset of member-provided videos corresponding to the received selection from the array using take selections; and displaying the selected combination of the plurality of combinations on the user terminal of the other member.

In an example, identifying a subset of the other members further comprises: obtaining at a first time a contact list from a social networking website, the contact list corresponding to the particular member; defining an initial list of members followed by the particular member using the obtained contact list; responsive to receiving a follow selection from the particular member at a second time that is after the first time, identifying a subsequent list of members by modifying the initial list responsive to the follower selection; and using the initial list or the subsequent list to identify the subset of the other members.

In an example, identifying a subset of the other members further comprises: identifying an attribute from the scene description; comparing the identified attribute to the profiles that correspond to the other members; and identifying the subset of the other members responsive to the comparison.

In an example, the operations further comprise: displaying the initial list or the subsequent list on the user terminal corresponding to the particular user; and wherein if a member selection is received from the user terminal of the particular member after the displaying, the subset of the other members is identified using the member selection.

Figure 2A:
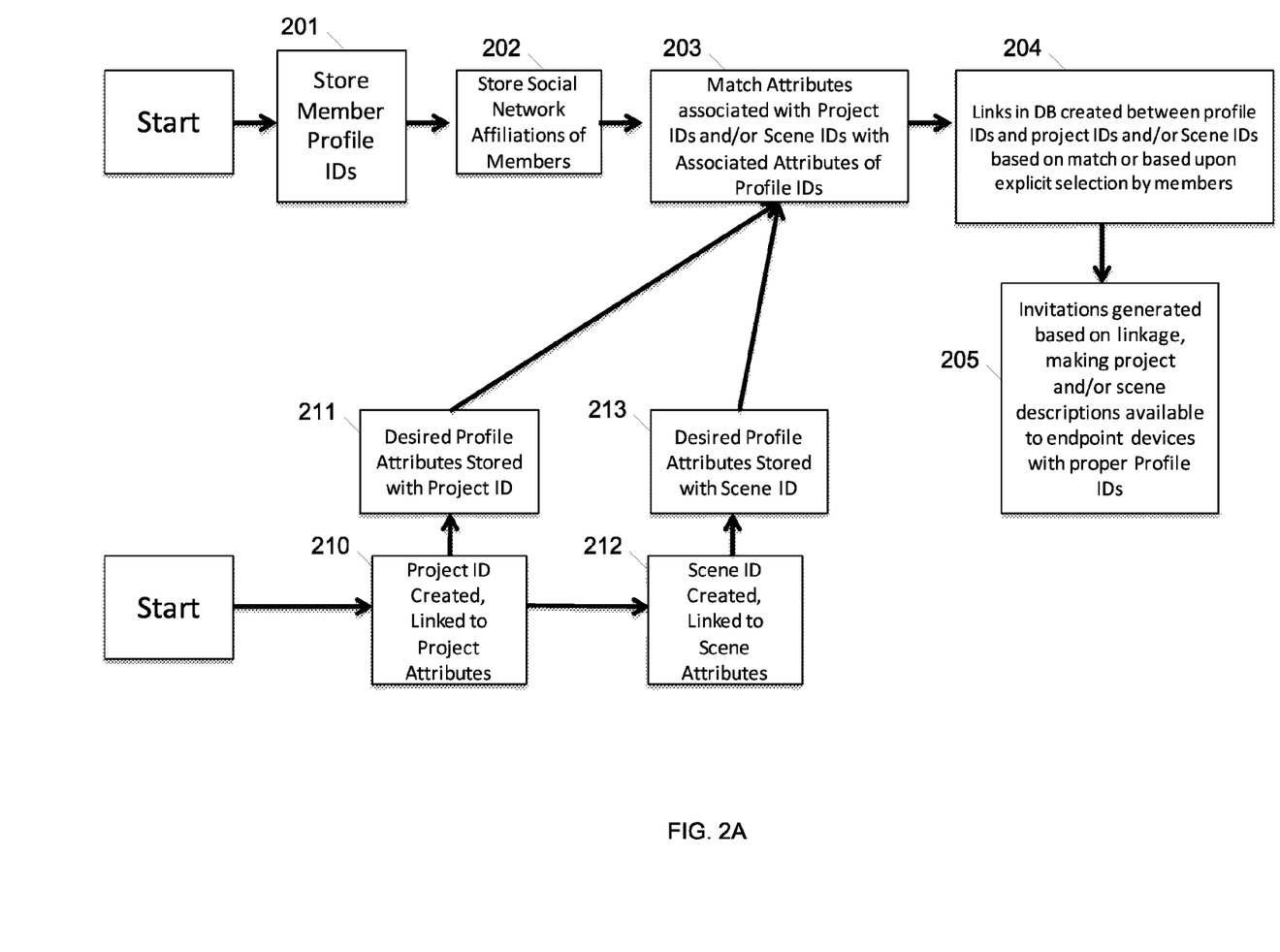
FIGS. 2A-B illustrates flow charts showing operation of the network device processing device of FIG. 1.
Figure 2B:
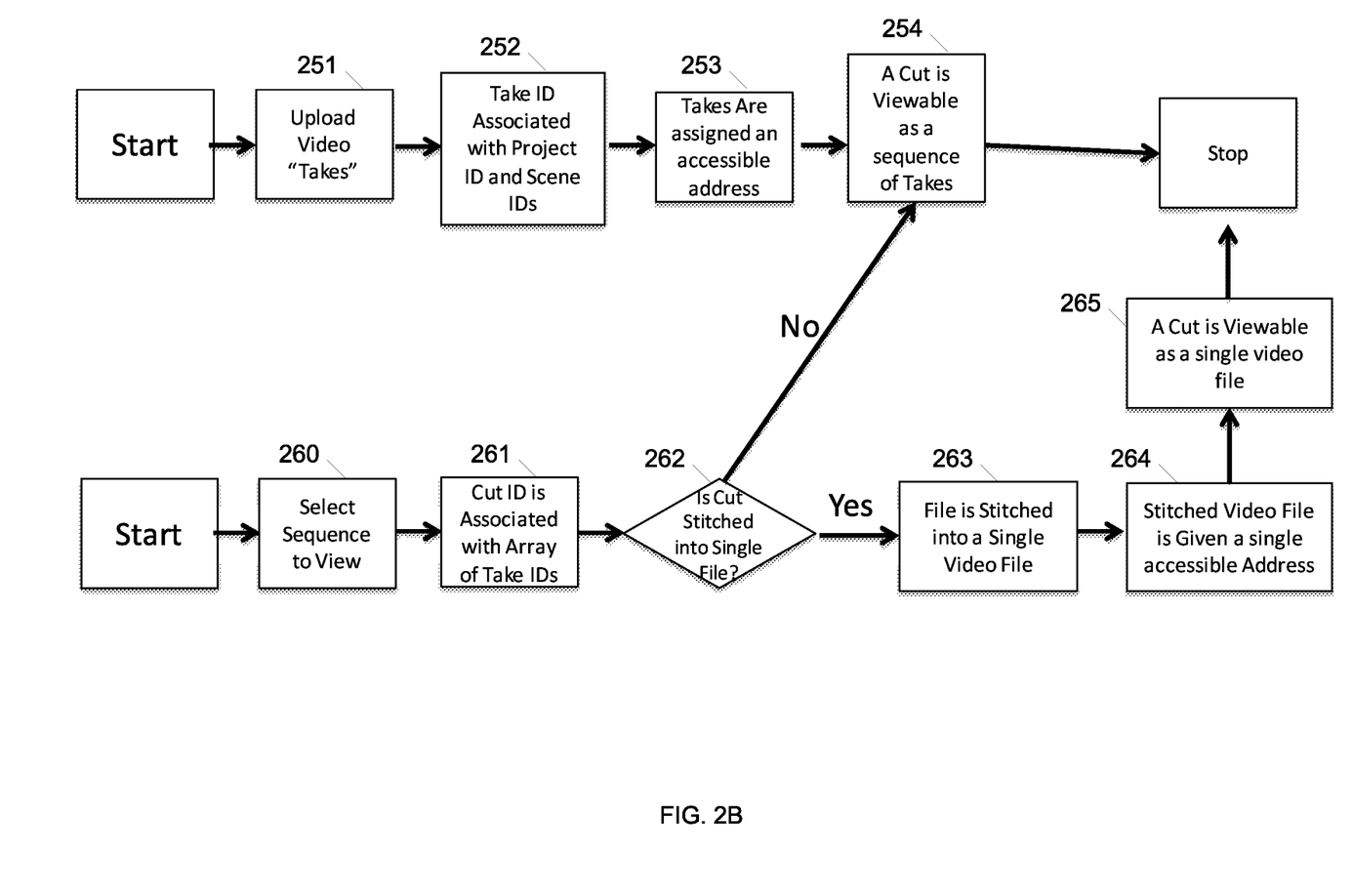

FIGS. 2A-B illustrate flow charts showing operation of the network device processing device of FIG. 1.

In block 201, the processing device 11 stores member profiles. In an example, the processing device 11 may obtain a portion of a member profile from a social networking site. The processing device 11 may identify a portion of predefined attributes according to the obtained portion. The processing device 11 may collect additional details from a user such as preferred genres, characters, movies, story themes, or the like, to identify other one(s) of the predefined attributes. The processing device 11 may store an indication of the identified attributes in a respective one of the member profiles.

In block 202, the processing device 11 may obtain a list of contacts from a social networking website, such as Facebook®. In an example, the processing device 11 may obtain at a first time a contact list from a social networking website, the contact list corresponding to a particular member; define an initial list of members followed by the particular member using the obtained contact list; responsive to receiving a follow selection from the particular member at a second time that is after the first time, identifying a subsequent list of members by modifying the initial list responsive to the follower selection; and using the initial list or the subsequent list to identify the subset of the other members.

In block 210, the processing device 11 may receive a request for a video project from one of the user terminals 12. Responsive to receiving the request, the processing device 11 may assign a project ID and/or extract a project ID from the request. The processing device 11 may identify project attributes associated with the project by extracting the project attributes from the request and/or selecting project attributes from predefined attributes according to information in the request. Project attributes may include title, topics characters, roles, or the like. In block 212, the processing device 11 may assign a scene ID for each scene of the project and/or extract the scene IDs from the request, and may identify scene attributes by extracting the scene attributes from the request and/or selecting scene attributes from predefined attributes according to information in the request. The processing device 11 may store an association of the identified project attributes and scene attributes to the project ID in blocks 211 and 213.

In block 203, the processing device 11 may select members to be included in the project and/or in a given scene. In an example, member selection may include determining an explicit member selection from the originating member of the project. In an example, the member selection may include determining whether one of the member profiles matches the project and/or the scene by comparing the attributes of the member profile to the project attributes and/or the scene attributes. A given member profile may be selected for an attribute if the given profile coincides with a project attribute and/or a scene attribute. In an example, a member profile may be selected for all scenes of the project, or only a subset of scenes of the project.

In block 204, the processing device 11 stores an indication of an association between profile IDs of the selected member profiles and the project ID and/or the scene ID. In block 205, the processing device 11 enables members of the profile IDs to contribute to the project, e.g. any scene of the project or only a subset of scenes of the project depending on the associations of the given profile ID. The term "inviting" is used herein to refer to the notion of this enabling of contributions. In some examples, such inviting includes an explicit invitation, e.g. the network device transmitting a message to be read by the member of the profile ID that they have been invited to contribute to a project and/or scene; however, in other examples inviting does not include the explicit invitation.

Referring now to FIG. 2B, in block 251 the processing device 11 may receive from a contributing user terminal a "take", e.g. a video upload corresponding to a scene of a created project. In block 252, the processing device 11 assigns a take identifier to the received take. The processing device 11 may also store an indication of an association between the assigned take identifier and the project ID and/or a corresponding scene ID indicated by the upload from the contributing user terminal.

In block 253, the processing device 11 assigns the take an accessible address. A similar operation is performed for the other takes of a project.

Block 254 may be responsive to the originating member of the project indicating that the project is ready to be published, e.g. all takes have been received. In block 254, the processing device 11 enables members, e.g. all members, the invited subset of members, or a different subset of the members, to view the published project. The viewing members may view a "cut" identified by the originating member. The term cut used herein refers to a selected subset of the takes of the project, e.g. one take per scene. The viewing members may also view all of the cuts of the project and select and share their own cuts.

In block 260, the processing device 11 may receive a selected sequence of takes of a pending or published project. The selected sequence may comprise an array of take identifiers (an array has been described previously herein). In block 261, the processing device 11 assigns a cut ID with the selected sequence, i.e. the array of take identifiers.

In block 262, the processing device 11 may be requested to stitch videos corresponding to the take identifiers of the array into a single video file. In that case, in block 263 the file is stitched (stitching has been discussed previously). In block 264, the processing device 11 assigns the stitched video file a network address. In block 265, the processing device 11 may enable members to view the stitched video file, which may include providing the assigned network address to some or all of the user terminals.

Regardless of whether the cut is stitched, the cut may be viewable as a sequence of takes, as per block 254. For example, the processing device 11 may receive a cut identifier, do a lookup for the take identifiers associated with the cut identifier, and then cause takes of the take identifiers to be displayed in the order selected by the member that created the cut. Again, viewers may view not only view the cut in some examples, but also the unselected takes (the takes that were not of the cut), in order to make their own cut that includes, for example, at least one unselected take.

Figure 3:
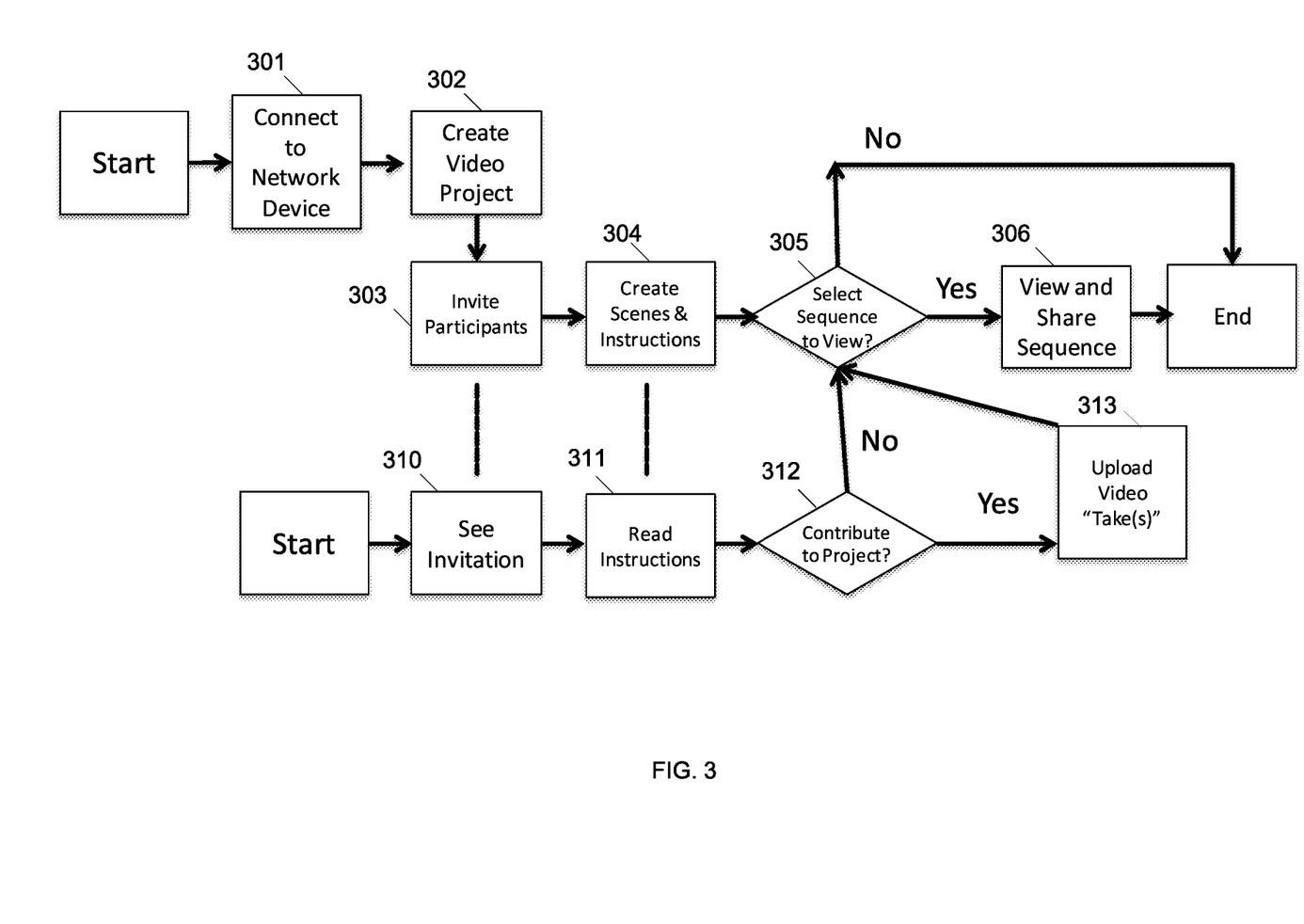
FIG. 3 illustrates a flow chart showing operation of the user terminal processing device of FIG. 1.

FIG. 3 illustrates a flow chart showing operation of the user terminal processing device of FIG. 1.

In block 301, the processing device 10 causes the user terminal to connect to the network device 13. The connection may be in response to the user terminal receiving an input to activate a distributed video service.

In block 302, the processing device 10 may cause a create video project user interface to be displayed on the user terminal 12. The create video project interface may enable a user to input a criterion for inviting participants into the video project, per block 303. For example, the user interface may enable the explicit identification of a member to be included in the video project, or the user interface may enable the identification of an attribute to be used by the network device to find a matching member to be invited. In an example, the invitations may be on a scene-by-scene and/or character-by-character basis.

The create video project interface may enable a user to create scene(s) for the video project, per block 304. The create project user interface may include a field to accept a description, for example, a text description, of each scene, per block 304. The scene descriptions input at this stage may be shared with the invited participants.

After the scene descriptions are shared, the processing device 10 may receive take identifiers for each uploaded take.

As per diamond 305, the processing device 10 may display an interface to enable the project creator (also referred to as a "director" in some examples) to select a subset of the takes. For example, the take identifiers may indicate a plurality of takes for at least some of the scenes, and the project creator may select, for example, one take for each scene. It should be understood that the processing device 10 may cause content of some or all of the takes to be displayed by the user terminal 12 to facilitate the selection.

If the processing device 10 receives a selection, the processing device 10 may upload (to the network device 13) an array per block 306. Responsive to the upload, members may view and share the sequence of takes indicated by the array.

In block 310, the processing device 10 may display an explicit invitation to a created video project and/or enable access to the created video project. In block 311, the processing device 10 may display instructions, e.g. scene instructions, of the created video project.

In diamond 312, the processing device 10 may receive a user input indicating a contribution to the project. The processing device 10 may upload a video and an indication of an associated project ID and/or scene ID as per block 313.

The processing device 10 may also display an indication of cuts of the project, allowing the user to select a cut of the project for display. The processing device 10 may also display an indication of the takes of the project, to allow the user to select their own cut to view and share per block 306.

Figure 4:
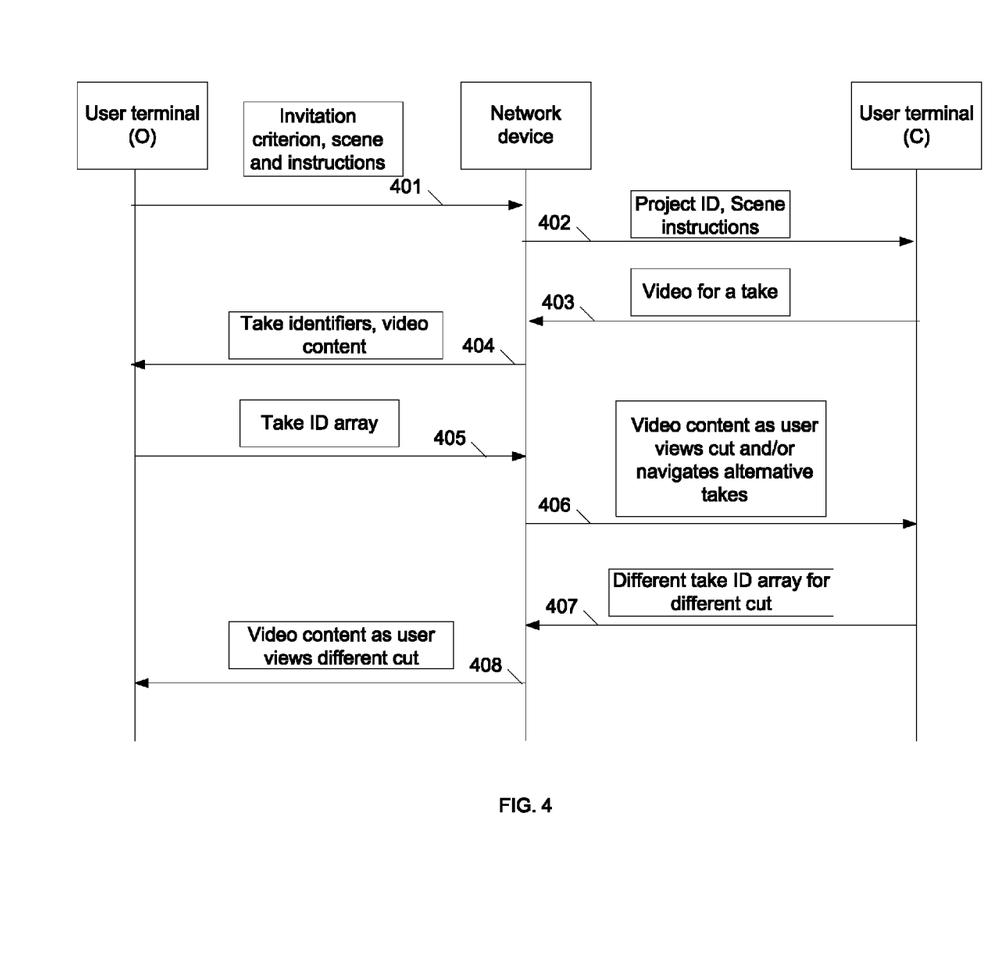
FIG. 4 illustrates a signaling diagram in an example operation of the system of FIG. 1.

FIG. 4 illustrates a signaling diagram in an example operation of the system of FIG. 1.

Some of the messages exchanged between an originating user terminal "O", a network device, and a contributing user terminal "C" in an example project are shown in FIG. 4. It should be understood that the illustration is not meant to show every message exchange in the example operation, nor every portion of the message, but rather selected messages and selected portions thereof for purpose of explanation of some aspects of the disclosed system for distributed video creation.

In an example operation, an invitation criterion and scene instructions are transmitted in a message 401 from an origination user terminal (User Terminal 'O'). The network device transmits a message 402 containing a project ID and scene instructions. The user terminal C transmits a message 403 containing video for a take.

The network device transmits in message 404 take identifiers (including a take identifier for the video of message 403) and video content to user terminal O. Responsive to a user selection of a cut from the available takes, the user terminal O transmits a message 405 including an array of take identifiers. The network device transmits video content responsive to a user viewing a cut and/or navigating alternative takes in message 406.

Assuming for the sake of explanation that the user terminal C receives a user input for a cut that is different than the cut by the originating member, the user terminal C transmits a message 407 with a different array of take IDs. The network device transmits a message 408 with video content as the user of the user terminal O views the different cut.

Programmatically Driving Competition for Video Projects

In an example, the system 100 may be configured to enable project creators and/or video contributors (participants) to compete for recognition or points (points are just simply numeric values stored in the database). In an example, features include:

Point allocation—Point values are associated with specific activity, including the creation, participation in videos, and the sharing of videos I've created or participated in, among many other actions that might be awarded. These points may be associated with my projects and its ID, or with specific users and their ID.

Sparring—Users with particular identifiers in the database may participate in competitions with other users, and depending on the number of likes, plays or shares of their contributions, may win additional point values (database values).

Challenges—Entities may post specific challenges to video creators and/or participants, and those may be associated with additional recognition or point values. Users may adopt the challenge as part of existing works (such as inclusion of product placement in their scenes), or the challenge may be to create a particular project or act in a particular scene. Point values for challenges may be related to most viewed, liked or shared projects or takes.

Viewing Takes of a Video Project

As discussed previously, takes of a project that is published from an originating terminal may be viewed by another user terminal. In an example, the processing device 11 is configured to enable navigation of the takes of a video project as follows:

Viewers may concurrently select their favorite scenes, takes, sequences, characters
  Viewers align the scenes, takes, characters they wish to view using an X-Y axis paradigm that arrays sequential scenes left to right and offers the available takes within a scene arrayed up and down
  Available takes may be ordered by date/time, by popularity, or by contributor
  The player allows fluid real-time streaming of any video that is aligned for viewing Projects, scenes, takes, sequences, characters, or the creators of the projects or contributors of the takes may be automatically chosen for the user based on the user's attributes
  The projects, scenes, takes, characters, project creators, video contributors may be aligned for viewing based upon the match of their identifiers or attributes with the attributes identified with the viewer
  The X-Y axis player may align automatically based upon the match or mathematical proximity of the match

Video Sequence Requests

The system 100 may enable a user terminal to publish to a portion of the other user terminals a video sequence request. In an example, features of the video sequence requests are as follows:

Video requests may be for specific sequences, or for sequences that meet certain criteria. Sequences can be either a linear sequence, OR may be a subset of scenes/takes that the user may still navigate/choose from manually.
  A user or system may make a request for a video meeting specific sequence criteria
    The identifiers associated with the project, scene, takes, characters/roles and/or project creators or video contributors may be specifically requested
    The request may also be for specific items by name
    The request may be any video sequence the specifically leads to a particular video. For example, a video clip may be the $10^{th}$ in a series, and only specific video clips lead to that $10^{th}$ clip, and so the request may be for all those that lead up to that particular clip.

Matching Criteria
  The video request may be for a sequence that matches a sequence of metadata in the database. For example, a person looking for an educational video on plumbing might choose to learn about copper piping, soldering, fittings, and fixtures, and the resulting video might have a clip associated with each topic.
    The matching process may be a direct match on tags associated with the video projects, scenes, takes, contributors or characters/roles, such as taking in a set of answers to a questionnaire, such as question 1 answer a, question 2 answer c, and question 3 answer b, and that sequence is aligned in the database with video (take) 1345, 4982, and 734 respectively.
  The matching process may also take advantage of a more intricate algorithm, such as a calculation of the topical or temporal proximity of available videos to the requested topics, as well as past request/viewing activity, preferences, or the request/viewing activity of requestors who bear similar attributes to the requestor
  The choice of which particular videos to include in the sequence may be based on a variety of attributes including popularity of the take, the contributor, or other attributes that may be manifested as point values for video

Delivering Video to a User Terminal

Figure 5:
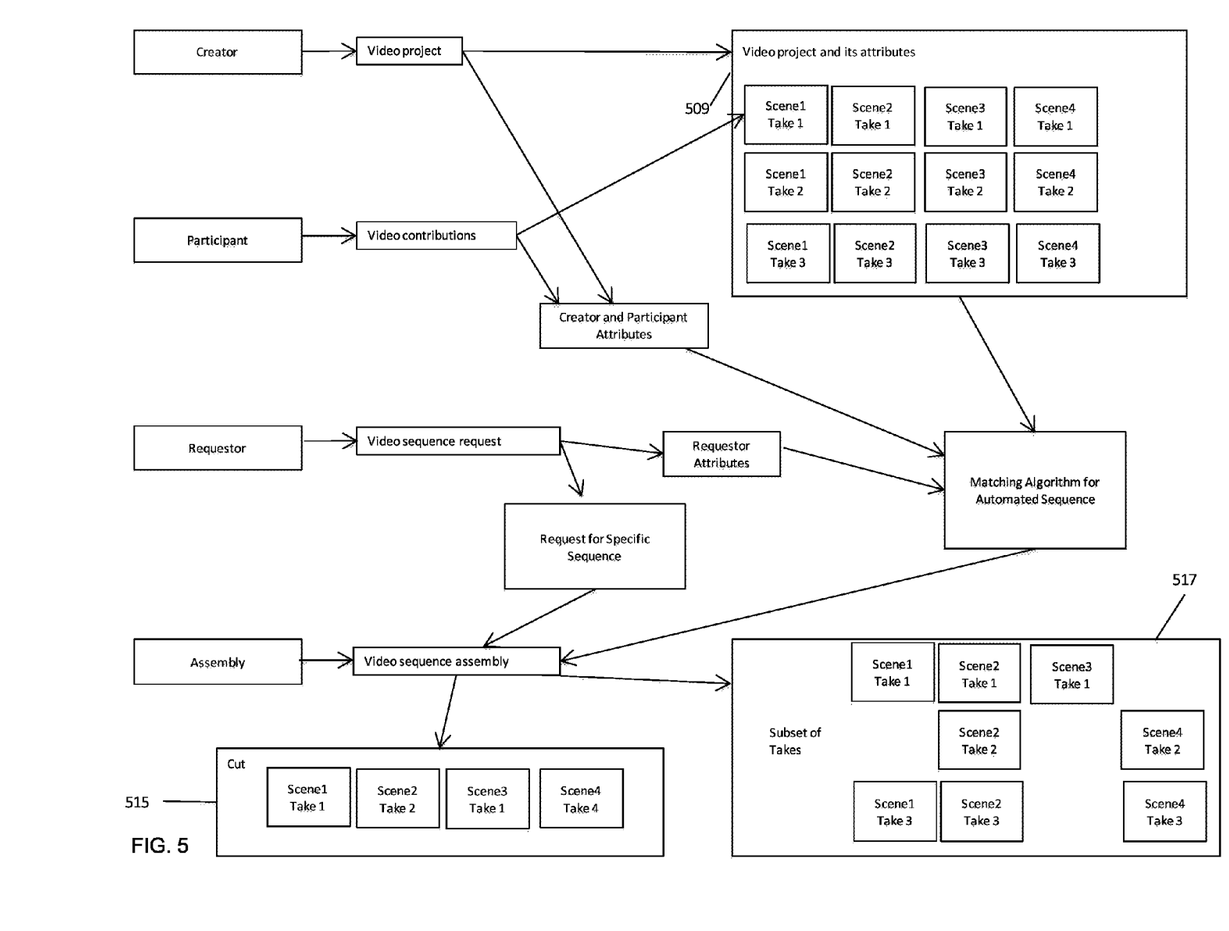
FIG. 5 illustrates the delivery of video to a user terminal in a distributed video creation system.

As discussed previously, a projected published by an originating user terminal may be shared with a portion of the other user terminals. Also, as discussed previously, the other terminals may also view a cut (a selected subset of the takes) and/or a combination of takes involving an unselected take. Accordingly, the system 100 may include video delivery features as explained in the bullets below and as shown in FIG. 5:

A video sequence may be delivered not just as a playlist (linear) but as a playlist with an additional dimension—both the X axis of sequential scenes, and the Y axis of alternate takes for any given scene.
The delivery may be a video file, an array of video files, an array of video files with both x and y axis coordinates, or simple a reference to those items, such as a file URL location, an array of file URL locations, or an array of file URL locations each with X and Y axis coordinates.
Video delivery may utilize a feature referred to in some examples as "filtering". FIG. 5 illustrates an example flow in an example system utilizing filtering principles. Preferences may be stored in a member profile, e.g. in a profile of a creator and/or view, as previously discussed. Attributes may be associated with a project, a scene, a take, and/or a profile, as previously discussed. The processing device 11 may filter available videos to generate a subset of profiles viewable by a member based on preferences in a member profile (the viewing member profile or another member profile such as creator member profile(s)) and/or attributes associated with the available. The viewing member may select from the filtered subset of available videos.

In a use case example of the above, a group of members, say ten members, contribute video to a project. However, the processing device 11 may determine that only video from a subset of the ten members, say five members, is to be viewable by the viewing member. FIG. 5 illustrates twelve takes of a video project 509, as well as a viewable subset 517 of the takes of the video project 509 and a cut 515 of the takes of the video project. The cut 515 is selected responsive to a member-selection of a sequence of the cuts of the project 509, whereas in contrast the subset 517 is selected responsive to operation of a filtering algorithm by the processing device 11.

Assembly/Ordering of video

As previously explained, the assembly of video into an order may involve the stitching of that ordered set of video clips into a single video, or kept as a sequence of video takes that simply plays in sequence. In an example, the system 100 enables the ordering of the sequence to include features as follows:

The specific order requested by the requestor
The order of videos aligned with the order of data sent by the requestor, directly matched to the video IDs (take IDs)
Based on attributes of requestor
  The order may be based on preferences, prior viewing behavior, or based upon the preferences or viewing behavior of others, or of others that are like the requestor
Based on attributes of the videos being requested
  Scene number
  Take number
  Date/Time
  Popularity
  Submitter
The storage of the IDs for the video clips in a particular order in the database, therefore, may be associated with only specific requestors or those who initiated the assembly of that sequence, with any particular order potentially being simultaneously requested by multiple people
There may be specific actions or benefits associated with picking a particular order, and that benefit or action may be established by the project creator or a challenge sponsor. For example, say that only one particular combination of videos out of all possible combinations is the correct order, such as if each take in each scene were a mathematical equation and only one out of all possible sequences results in a particular mathematical result. A benefit, award, or some type of recognition or points might be associated with finding the correct combination, and possibly for being the first to find the combination.

It will be obvious to those having skill in the art that many changes may be made to the details of the above-described embodiments without departing from the underlying principles of the invention. The scope of the present invention should, therefore, be determined only by the following claims.

Most of the equipment discussed above comprises hardware and associated software. For example, the typical electronic device is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

Having described and illustrated the principles of the invention in a preferred embodiment thereof, it should be apparent that the invention may be modified in arrangement and detail without departing from such principles. We claim all modifications and variations coming within the spirit and scope of the following claims.

The invention claimed is:

1. A memory device having instructions stored thereon that, in response to execution by a processing device, cause the processing device to perform operations comprising:
  storing in a database on a network a plurality of profiles each corresponding to a respective member of a distributed video service;
  receiving a description of a scene from a particular one of the members;
  identifying a subset of the other members;
  causing user terminals associated with only the identified subset of members to display the received description of the scene;
  assigning each video of a plurality of member-provided videos with a different take identifier;
  providing information associated with the member-provided videos to a user terminal associated with the particular one of the members, wherein the provided information includes at least the take identifiers;

receiving a selection from the user terminal associated with the particular one of the members, wherein the received selection includes a take identifier of the plurality of take identifiers; and combining the member-provided video associated with the take identifier of the received selection with another one of the member-provided videos.

2. The memory device of claim 1, wherein the received description of the scene comprises more than one scene description, and wherein the received selection includes a plurality of take identifiers at least one of which corresponds to a different one of the scene descriptions than another one of the plurality of take identifiers; and wherein the operations further comprise:

assigning a first video of the plurality of member-provided videos with a first scene identifier that is different than a second scene identifier assigned to a second video of the plurality of member-provided videos;

providing an array of the scene identifiers and the take identifiers to the user terminal associated with the particular member.

3. The memory device of claim 2, wherein the operations further comprise, in response to receiving a selection from the array, generating a single media file that includes a subset of the member-provided videos in a sequential order according to the scene identifiers of the member provided videos of the subset.

4. The memory device of claim 2, wherein the operations further comprise:

in response to receiving a selection from the array, enabling a user terminal of the other members to select from a plurality of combinations of a subset of member-provided videos corresponding to the received selection from the array using take selections; and displaying the selected combination of the plurality of combinations on the user terminal of the other member.

5. The memory device of claim 1, wherein identifying a subset of the other members further comprises:

obtaining at a first time a contact list from a social networking website, the contact list corresponding to the particular member;

defining an initial list of members followed by the particular member using the obtained contact list;

responsive to receiving a follow selection from the particular member at a second time that is after the first time, identifying a subsequent list of members by modifying the initial list responsive to the follower selection; and using the initial list or the subsequent list to identify the subset of the other members.

6. The memory device of claim 1, wherein identifying a subset of the other members further comprises:

identifying an attribute from the received description of the scene;

comparing the identified attribute to the profiles that correspond to the other members; and identifying the subset of the other members responsive to the comparison.

7. The memory device of claim 5, wherein the operations further comprise:

displaying the initial list or the subsequent list on the user terminal corresponding to the particular user; and wherein if a member selection is received from the user terminal of the particular member after the displaying, the subset of the other members is identified using the member selection.

8. A method, comprising:

storing in a database on a network a plurality of profiles each corresponding to a respective member of a distributed video service;

receiving a description of a scene from a particular one of the members;

identifying a subset of the other members;

causing user terminals associated with only the identified subset of members to display the received description of the scene;

assigning each video of a plurality of member-provided videos with a different take identifier;

providing information associated with the member-provided videos to a user terminal associated with the particular one of the members, wherein the provided information includes at least the take identifiers;

receiving a selection from the user terminal associated with the particular one of the members, wherein the received selection includes a take identifier of the plurality of take identifiers; and transmitting an indication of the selection over an electronic network to a different user terminal associated with a different one of the members.

9. The method of claim 8, wherein the received description of the scene comprises more than one scene description, and wherein the received selection includes a plurality of take identifiers at least one of which corresponds to a different one of the scene descriptions than another one of the plurality of take identifiers; and wherein the method further comprises:

assigning a first video of the plurality of member-provided videos with a first scene identifier that is different than a second scene identifier assigned to a second video of the plurality of member-provided videos;

providing an array of the scene identifiers and the take identifiers to the user terminal associated with the particular member.

10. The method of claim 9, further comprising, in response to receiving a selection from the array, generating a single media file that includes a subset of the member-provided videos in a sequential order according to the scene identifiers of the member provided videos of the subset.

11. The method of claim 9, further comprising:

in response to receiving a selection from the array, enabling a user terminal of the other members to select from a plurality of combinations of a subset of member-provided videos corresponding to the received selection from the array using take selections; and displaying the selected combination of the plurality of combinations on the user terminal of the other member.

12. The method of claim 8, further comprising:

obtaining at a first time a contact list from a social networking website, the contact list corresponding to the particular member;

defining an initial list of members followed by the particular member using the obtained contact list;

responsive to receiving a follow selection from the particular member at a second time that is after the first time, identifying a subsequent list of members by modifying the initial list responsive to the follower selection; and using the initial list or the subsequent list to identify the subset of the other members.

13. The method of claim 8, further comprising:

identifying an attribute from the received description of the scene;

comparing the identified attribute to the profiles that correspond to the other members; and identifying the subset of the other members responsive to the comparison.

14. The method of claim 12, further comprising:
displaying the initial list or the subsequent list on the user terminal corresponding to the particular user; and
wherein if a member selection is received from the user terminal of the particular member after the displaying, the subset of the other members is identified using the member selection.

15. The method of claim 8, wherein the selection includes a plurality of take identifiers, and the method further comprises combining the member-provided video associated with a first take identifier of the plurality of take identifiers with another one of the member-provided videos, wherein the another one of the member-provided videos is associated with a second take identifier of the plurality of take identifiers.

16. A memory device having instructions stored thereon that, in response to execution by a processing device, cause the processing device to perform operations comprising:

storing in a database on a network a plurality of profiles each corresponding to a respective member of a distributed video service;

receiving a description of a scene from a particular one of the members;

identifying a subset of the other members;

causing user terminals associated with only the identified subset of members to display the received description of the scene;

assigning each video of a plurality of member-provided videos with a different take identifier;

providing information associated with the member-provided videos to a user terminal associated with the particular one of the members, wherein the provided information includes at least the take identifiers;

receiving a selection from the user terminal associated with the particular one of the members, wherein the received selection includes only a subset of the plurality of take identifiers; and transmitting an indication of the selection over an electronic network to a different user terminal associated with a different one of the members.

* * * * *